(12) United States Patent
Harrington et al.

(10) Patent No.: US 7,854,964 B2
(45) Date of Patent: Dec. 21, 2010

(54) CRYSTALLINE RESIN SANDWICH FILMS

(75) Inventors: Chris Harrington, Ware (GB); Philip C. Hadley, Ely (GB)

(73) Assignee: Hexcel Composites, Ltd., Duxford (GB)

( * ) Notice: Subject to any disclaimer, the term of this patent is extended or adjusted under 35 U.S.C. 154(b) by 0 days.

(21) Appl. No.: 12/651,564

(22) Filed: Jan. 4, 2010

(65) Prior Publication Data
US 2010/0104763 A1      Apr. 29, 2010

Related U.S. Application Data

(62) Division of application No. 11/596,444, filed on Nov. 13, 2006, now Pat. No. 7,666,804.

(30) Foreign Application Priority Data
Jun. 21, 2004   (WO) ................ PCT/IB2004/002105

(51) Int. Cl.
*B05D 3/02* (2006.01)
(52) U.S. Cl. .................. 427/385.5; 427/389.9; 427/394
(58) Field of Classification Search ........................ None
See application file for complete search history.

(56) References Cited

U.S. PATENT DOCUMENTS

| | | | |
|---|---|---|---|
| 5,206,313 A | 4/1993 | Ono et al. | |
| 6,787,237 B2 * | 9/2004 | Simmons et al. | 428/413 |
| 7,255,549 B2 * | 8/2007 | Hadley | 425/129.1 |
| 7,267,868 B2 | 9/2007 | Gallet et al. | |
| 7,709,083 B2 * | 5/2010 | Harrington et al. | 428/319.3 |
| 2004/0071948 A1 | 4/2004 | Gallet et al. | |
| 2008/0233823 A1 | 9/2008 | Harrington et al. | |
| 2010/0124863 A1 * | 5/2010 | Harrington et al. | 442/286 |

FOREIGN PATENT DOCUMENTS

| | | | |
|---|---|---|---|
| EP | 1050564 A | | 11/2000 |
| JP | 09077847 A | | 3/1997 |
| JP | 10-202814 | * | 8/1998 |
| JP | 2000/281754 A | | 10/2000 |

* cited by examiner

*Primary Examiner*—Erma Cameron
(74) *Attorney, Agent, or Firm*—W. Mark Bielawski; David J. Oldenkamp

(57) ABSTRACT

A resin composition that is storable at ambient temperatures. The resin composition forms a cured resin when exposed to a curing agent and heated to a curing temperature that is relatively close to ambient temperature. The resin composition includes a crystalline resin component that is sandwiched between two non-crystalline resin components to provide a zone that is rich in crystalline thermosetting resin. The crystalline thermosetting resin has a melting point that is above ambient temperature, but below the curing temperature. The viscosity of the resin component changes from a high viscosity state to a low viscosity state when the temperature is increased from ambient temperature to the curing temperature.

20 Claims, 4 Drawing Sheets

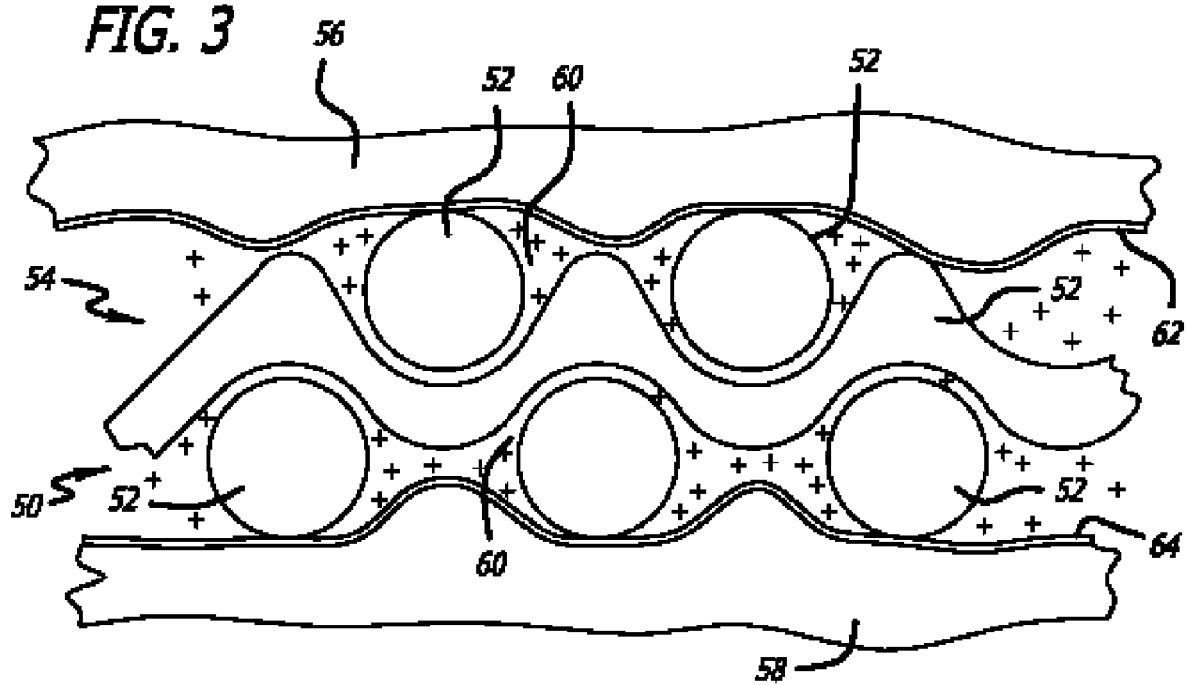

CRYSTALLINE RESIN SANDWICH FILMS

This application is a divisional of U.S. patent application Ser. No. 11/596,444 which has a filing or 371(c) date of Nov. 13, 2006.

BACKGROUND OF THE INVENTION

1. Field of the Invention

The present invention relates generally to thermosetting resins and the many different types of compositions that contain such thermosetting resins. More particularly, the invention involves those types of thermosetting resins and compositions that are stored at ambient temperatures and then cured by adding a curing agent and increasing the temperature of the resin to a curing temperature that is relatively close to the storage temperature. The present invention involves providing resins that have a relatively high viscosity at ambient storage temperatures and are suitable for use as adhesives and in prefabricated uncured composites known as prepreg. The resins are converted to a low viscosity material when heated to curing temperatures to provide a rapid flow of the resin that may be required for adequate mixing with curing agents and/or penetration into porous bodies such as fiber bundles and fabric.

2. Description of Related Art

Thermosetting resins are used as a principal ingredient in a multitude of different materials. For example thermosetting resins are widely used alone or in combination with certain additives to form adhesives. Thermosetting resins are also combined with a wide variety of fiber types and configurations to form composite materials. Epoxy resins, vinyl ester resins and cyanate ester resins are examples of thermosetting resins that have been in widespread use for many years.

The curing procedure for thermosetting resins typically involves adding one or more curing agents to the uncured resin to form an activated resin. The activated resin is then usually heated for a sufficient time to completely cure the resin. In many situations, it is desirable to prepare the activated resin and then store it for later use. During storage, the activated resins must be kept at temperatures that are well below the curing temperature of the resin in order to avoid premature curing. For this reason, many activated thermosetting resins cannot be stored at ambient temperatures. Accordingly, it has been common in the past to keep such activated resins refrigerated until they are ready to be used.

Composite materials are used extensively in situations where high strength and low weight are desired. Composites typically include fibers and a resin formulation as the two principal elements. Wide ranges of fiber types, sizes and orientations have been used in composites. Glass, graphite, carbon, p-aramid, m-aramid, quartz, thermoplastic, boron, ceramic and natural fibers are common. The fibers can be chopped, stretch broken, randomly oriented, unidirectional in orientation or woven into fabric. The fibers used in composite materials have diameters that range from extremely small to relatively large. Although it is possible to make composites using large diameter fibers, the more common practice is to take thousands of fibers having extremely small diameters and form them into individual bundles known as tows. These multi-fiber tows are much stronger and more flexible than single fibers having the same overall dimensions. Filament bundles can have a wide variety of cross-sectional shapes including ellipsoidal, kidney and pea shapes. The tows can be woven into fabric in the same manner as conventional yarns. Alternatively, the tows are arranged in parallel to provide a unidirectional fiber orientation or they can be randomly oriented.

Thermosetting resins have been widely used as the resin matrix in composite materials. There are a number of ways to combine the resin with the fibers to form the final composite. One approach that has been used for years is to impregnate the fibers with activated resin and allow the resulting "lay-up" to cure at room temperature. The cure time is usually reduced substantially by heating the lay-up. This type of process is well suited for use in the field. However, this wet lay-up process has a disadvantage in that it is difficult to accurately control the amount of resin that is applied to the fibers and ensure that the resin is being uniformly impregnated into the fibers. In addition, the amounts of curing agent and other additives that are added to the resin may vary between lay-ups.

In order to avoid the above problems, it has been common practice to form prefabricated lay-ups that include fibers, resin and curing agent. These prepregs are made under manufacturing conditions that allow the amount and distribution of resin and curing agent within the fibers to be carefully controlled. The prepregs are typically refrigerated during storage and shipping to prevent premature curing of the resin matrix. The need to refrigerate prepreg presents a number of problems. It is expensive to store and ship prepreg on a commercial level because large refrigeration units are required and refrigerated trucks must be used. In addition, the temperature of the prepreg must be continually monitored to detect any increase in temperature due to equipment failure or the like. Increases in temperature, even for short periods of time, can adversely affect the shelf life and function of the prepreg and result in the prepreg being discarded.

One approach to eliminating the need for refrigeration of prepreg involves placing the resin and curing agent in the prepreg structure so that they are physically separated from each other. For example, the resin and curing agent can be located on opposite sides of a layer of woven fabric to form a prepreg that can be stored indefinitely at room temperature as described in U.S. patent application Ser. No. 10/648,159, now U.S. Pat. No. 7,267,868. When ready for use, the prepreg is heated, usually under pressure, so that the resin and curing agent flow into the fabric to initiate the curing process. The basic approach used in these types of systems is to store the resins and curing agents as separate entities that are in sufficiently close proximity to each other so that they can be mixed together by heating. This type of approach can also be used for thermosetting adhesives and other applications where the structure of the system allows the resins and curing agents to be kept in close proximity to each other without contact. Such systems typically include a porous body of some type that provides the structure in which the resin and curing agents are located.

There are a number of desirable properties that the resins and curing agents should have in order to be used in the ambient temperature storage systems described above. For example, the resin should be sufficiently viscous at room temperature so that it does not flow to any appreciable extent into contact with the curing agent. At the same time, the resin must retain sufficient tackiness and other properties that are desirable in a prepreg. The resin should be convertible to a relatively low viscosity material when heated to provide rapid and thorough mixing of the resin and curing agent. For resins that cure at relatively low temperatures, the change in resin viscosity should occur at temperatures that are relatively close to room temperature. For example, the viscosity change should preferably occur within 10° C. to 60° C. above ambient temperatures.

There is a present and continuing need to develop resins that are suitable for use in prepreg and other systems of the type described above that can be stored at ambient temperatures. In addition, there is a present and continuing need to develop prepreg and other system configurations that include resin/curing agent combinations that can be stored at ambient temperatures while still demonstrating the ability to undergo efficient cure at temperatures not significantly higher than ambient temperature. Cure temperatures below 100° C., more preferably below 80° C., and most preferably as low as 60° C. are of increasing interest to resin and/or prepreg converters because the use of these temperatures offers significant benefits in terms of energy consumption. Furthermore, as the cure temperature is decreased the processing equipment needed to cure the epoxy resin formulations becomes somewhat simpler and less expensive. For example, it becomes possible to use temporary, bespoke curing ovens constructed using inexpensive, relatively temperature-sensitive components such as wood and polyolefinic sheeting. The resins should undergo relatively large reductions in viscosity over relatively small increases in temperature to provide thorough mixing of the resin and curing agent as well as uniform distribution of the resin throughout the cured structure.

One approach for providing such room temperature stabile prepregs has involved the use of gelator-stabilized resin compositions that are described in PCT Application No. IB2004/000944. The resins include a liquid part that is composed of one or more non-crystalline thermosetting resins and a solid part that is composed of particles of one or more crystalline thermosetting resins wherein the solid part is dispersed within the liquid part. The particles have a melting point that is above ambient temperature and below the curing temperature. The liquid part further includes a gelation agent that is present in a sufficient amount to form the liquid part into a gel that is sufficiently gelatinous to maintain the particles in suspension within the liquid part at ambient temperature. The gelation agent has a melting temperature that is below the curing temperature such that the viscosity of the resin changes from a high viscosity state to a low viscosity state when the temperature of said resin composition is increased from ambient temperature to the curing temperature. This decrease in viscosity is enabled not only by the thermal breakdown of the gelation agent, but also by fusion of the crystalline resin particles. Unlike higher molecular mass (substantially amorphous) epoxy resins, the melt transition of crystalline resins occurs over a narrow, predictable, and well-defined temperature range.

The resins described in PCT Application No. IB2004/000944 are well suited for use in prepreg and other systems of the type described above that are designed to be stored at ambient temperatures. They are especially useful because a relatively small increase above ambient temperature is all that is required to convert the resin composition (liquid resin/solid resin/gelator) from a relatively viscous and tacky material to a flowing material that can penetrate porous structures, such as fiber bundles and fabric that contains fiber bundles. Upon penetration, the resin composition mixes with the desired curing agent to provide for relatively low temperature curing of the resin.

SUMMARY OF THE INVENTION

In accordance with the present invention, uncured resin compositions are provided that have properties similar to the gelator-stabilized resins described above, but which do not require the use of a gelation agent. The resin compositions of the present inventions have a similar viscosity profile wherein a substantial drop in viscosity occurs when the resin composition is heated above ambient temperatures. The present resin compositions also have similar tack and stability at ambient temperatures.

The present invention is based on providing a resin composition that has a zone which is rich in crystalline thermosetting resin. The resin composition is storable at ambient temperatures and is capable of forming a cured resin when exposed to a curing agent and heated to a curing temperature that is relatively close to ambient temperature. The resin composition includes at least two non-crystalline components that are composed of one or more non-crystalline thermosetting resins. A crystalline component that includes one or more crystalline thermosetting resins is located between the two non-crystalline components to provide a zone that is rich in crystalline thermosetting resin. The crystalline thermosetting resin(s) has a melting point that is above ambient temperature and below said curing temperature.

The resin composition may be used in the same manner as the previously described gelator-stabilized resins to form prepreg and other uncured resin composites that include a porous body and a curing component wherein the curing component is located separate from, but in close proximity to the uncured resin. Upon heating above ambient temperature, the resin composition is converted into a low viscosity material that penetrates relatively rapidly into the porous structure and mixes thoroughly with the curing component. As an additional feature of the present invention, fabric and other porous bodies may be located in the crystalline component and/or the non-crystalline component of the resin composition.

The above described and many other features and attendant advantages of the present invention will become better understood by reference to the following detailed description when taken in conjunction with the accompanying drawings.

BRIEF DESCRIPTION OF THE DRAWINGS

FIG. 3 is a diagrammatic representation of a prepreg in which the porous body is woven fabric that has been impregnated with a curative component. The uncured resin is provided in accordance with the present invention as a resin composition that is located on either side of the fabric.

DETAILED DESCRIPTION OF THE INVENTION

Figure 1:
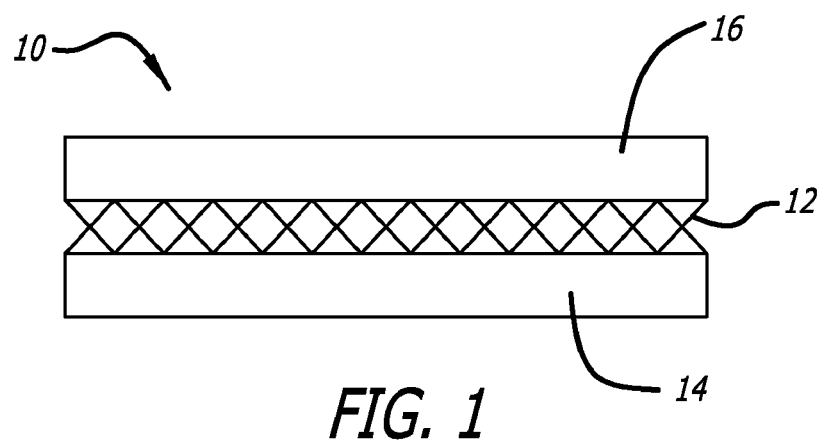
FIG. 1 is a diagrammatic representation of an exemplary embodiment of the present invention where the crystalline component is shown as a film or particles located between two layers of non-crystalline component.

Resin compositions in accordance with the present invention are intended for use in situations where the uncured resin is stored at ambient or room temperature over extended periods of time. For the purposes of this specification, "ambient" or "room" temperature is considered to be temperatures between about 10° C. and about 30° C. More preferably, ambient or room temperature is between about 20° C. and 25° C. The uncured resin compositions form a cured resin when exposed to a curing agent and heated to a curing temperature that is higher than the ambient temperature at which the uncured resin is stored. The difference between the ambient storage temperature and the curing temperature ranges between 10° C. and 60° C. Curing temperatures of 40° C.-90° C. are preferred. The resin compositions are in a high viscosity state when the uncured resin is at ambient temperatures. The viscosity of the uncured resin in the high viscosity state is such that the resin does not flow freely, but still retains a certain degree of tackiness that is required in many applications. The viscosity of the uncured resin composition in the high viscosity state will vary between the portions or zones that are rich in the crystalline thermosetting resin and the portions or zones that are composed entirely of non-crystalline resin. For those portions or layers that are composed mainly of non-crystalline resin, it is preferred that the viscosity of the uncured resin in the high viscosity state be between about 20 Pas and 70 Pas at 60° C.

In the high viscosity state, the uncured resin can be stored in relatively close proximity to curative components that contain one or more curing agents. When the temperature of the resin composition is increased from ambient temperature to the curing temperature, the uncured resin is converted to a low viscosity state. The uncured resin is substantially more viscous in the high viscosity state than in the low viscosity state. The uncured resin in the low viscosity state is able to flow relatively freely into contact with the curative component. The viscosity of the uncured resin in the low viscosity state is preferably between about 10 Pas and 0.1 Pas at the desired curing temperature. The crystalline resin melts and mixes with the non-crystalline resin during conversion of the uncured resin to the low viscosity state. This provides a uniform resin composition having a uniform viscosity. This is in contrast to the high viscosity state where the viscosity varies between the crystalline and non-crystalline components.

The uncured resin is in the form of a sandwich structure wherein a crystalline resin component is located between layers of non-crystalline to provide a zone that is rich in crystalline thermosetting resin. The non-crystalline layers or components contain one or more non-crystalline thermosetting resins. The crystalline resin component includes one or more crystalline thermosetting resins. The non-crystalline thermosetting resins may be any of the resins that can be stored at ambient temperatures and that can be cured with appropriate curing agents at the curing temperatures set forth above. Resins that are suitable include epoxy resins, vinyl esters, unsaturated polyesters, isocyanates, phenolics and cyanate esters. Exemplary resins include epoxy resins such as the glycidyl derivatives of bisphenol A and bisphenol F; the glycidyl derivatives of p-aminophenol and m-aminophenol; monoglycidyl derivatives of aromatic, aliphatic and alicyclic alcohols such as cresyl glycidyl ether, t-butylphenyl glycidyl ester of neodecanoic acid; polyglycidyl derivatives of polyhydroxy compounds such as glycerol, trimethylolpropane and butanediol; 3,4-epoxycyclohexylmethyl 3,4-epoxycyclohexanecarboxylate, vinylcyclohexene dioxide, hydrogenated bisphenol A diglycidyl ether, bis(2,3-epoxycyclopentyl)ether, the diglycidyl ester of 1,2-cyclohexanedicarboxylic acid, diglycidyl phthalate; aliphatic amines such as 1,3-propanediamine, N,N-diethyl 1,3-propanediamine, triethylene tetramine, diethylene triamine, 4,7,10-trioxadecane-1,13-diamine, m-xylylene diamine; aromatic amines such as benzyldimethylamine, benzylamine, 2-4-diethyl toluene diamine and its mixtures, 2,4-dithiomethyl toluenediamine, tris(dimethylaminomethyl)phenol; alicyclic and heterocyclic amines such as 1,3-cyclohexane diamine, 1,2-cyclohexane diamine, isophorone diamine, p-menthane diamine, methylenebis-(4-cyclohexylamine) and its alkyl substituted derivatives, 1,3-bis-(aminomethyl)cyclohexylamine, aminoethyl piperazine, bis(aminopropyl)piperazine, 1-methylimidazole and other imidazoles; anhydrides such as hexahydrophthalic anhydride, methylhexahydrophthalic anhydride, methyl nadic anhydride; cyanate esters such as the dicyanate esters of bisphenol E, bisphenol A, bisphenol F; vinyl esters such as the acrylate and methacrylate esters of bisphenol A diglycidyl ether and their substituted derivatives and their mixtures with monomeric diluents such as styrene, methacrylates and acrylates; diluents and flexibilizers of many classes well known in the art; flame retardants such as those containing phosphorous, including phosphates and phosphonates; catalysts such as boron trihalides and their amine adducts and mixtures thereof with diluents and carriers; peroxides and hydroperoxides.

The crystalline component of the resin composition that is located or sandwiched between the non-crystalline resin component is preferably in the form of one or more films or crystalline resin particles that provide a zone which is rich in crystalline thermosetting resin. The term "rich" is intended to include crystalline thermosetting resin concentrations that range from 50 weight percent up to 100 weight percent. For example, a crystalline resin film that is composed entirely of crystalline thermosetting resin provides a well-defined zone that is rich (for example, 99+ weight percent) in crystalline thermosetting resin. When particles of crystalline resin are used, the zone that is rich in crystalline thermosetting resin will typically have less than 100 weight percent crystalline resin. The actual concentration will vary depending upon the amount and size of crystalline resin particles and the amount of non-crystalline resin that has infused into the particles present in crystalline-rich zone. Particle sizes that range from 10 mm down to 0.001 mm are suitable. Particles that are smaller than 2 mm are preferred with particle sizes of between 0.5 mm and 0.15 mm being particularly preferred. The particles can be made from any thermosetting polymer or resin that is crystalline at room temperature and has a melting point that is below the curing temperature selected for the particular resin composition. Exemplary preferred crystalline resin particles are made from materials such as, crystallized Ruetapox 0158 that is available from Bakelite AG (Duisberg, Germany) and crystallized DER 332 that is available from Dow Chemical Company (Wilmington, Del.). As mentioned above, the crystalline resin may also be in the form of one or more films instead of particles wherein the films are made from the same materials as the particles using known film forming processes.

The amount of crystalline resin that is located between the non-crystalline layers may be varied. It is preferred that the amount of crystalline resin be sufficient to provide the desired drop in viscosity when the resin composition is heated above ambient temperature and the crystalline resin melts and mixes with the non-crystalline layers. The actual amount of crystalline resin needed to achieve the target high and low viscosity states can be determined by routine experimentation. Typically, from 0.5 to 10 parts by weight per square meter of crystalline resin will be sandwiched between 1 part by weight per square meter of total non-crystalline resin located on both sides of the crystalline resin. A preferred loading is 1 part crystalline resin per square meter sandwiched between 1 part total liquid resin per square meter. An example of a typical sandwich film will contain about 200 grams per square meter (gsm) of crystalline resin sandwiched between two layers of non-crystalline resin that contain about 100 gsm resin each.

The uncured resin compositions are preferably prepared by applying the crystalline resin to the surface of a layer of non-crystalline resin and then applying a second layer of non-crystalline resin to form a crystalline resin sandwich or composition as shown in FIG. 1 at 10. The crystalline resin sandwich or composition 10 includes a crystalline resin component that is shown as particle layer or zone 12 and a non-crystalline resin component that is made up of layers or films of non-crystalline resin 14 and 16. The two non-crystalline layers 14 and 16 may be composed of the same or different resins. The crystalline particle layer 12 can be formed by sprinkling particles of crystalline resin onto the surface of layer 14. The particles may be compacted into the resin layer 14, if desired. Alternatively, the crystalline resin can be formed into a resin film that is sandwiched between the two non-crystalline layers 14 and 16. Either way, a zone 12 is provided in the center of the composition that is rich in crystalline thermosetting resin. If desired, reinforcing fibers or fabric may be located in either the crystalline component or the non-crystalline component. The outer resin layers 14 and 16 consolidate with the crystalline layer 12 to provide a dispersion of crystalline resin with liquid (non-crystalline) resin such that the outer layers are substantially of the correct aspect and viscosity for use in composite manufacturing processes and the crystalline resin is substantially hosted completely within the non-crystalline resin layers.

The resin composition is preferably in the form of a sandwich film that can be stored "as is" or combined with a curative component prior to storage or use. Configurations other than thin films are possible depending upon the final intended use of the resin composition. At ambient temperature, the outer layers containing the non-crystalline resin are in a relatively high viscosity state and can be stored for relatively long storage times. Storage times may be as short as a few hours or as long as a few months or more.

The uncured crystalline resin sandwich is preferably stored in combination with a curative component that is located in close proximity to the resin, but not in chemical contact therewith. The crystalline resin sandwich and curative component may simply be stored side by side with a barrier located between them. However, it is preferred that the crystalline resin sandwich and curative component be stored in combination with one or more porous bodies that provide a structure in which the crystalline resin sandwich and curative component may be stored in close proximity without chemical contact. The porous body can be anything that has an exterior surface and interior surfaces that are located within the porous body. The preferred porous bodies are those composed of the fibers that are used in making composite materials. Other porous bodies that may be used include open cell foam, honeycomb and thermoplastic scrims.

If desired, an optional removable reaction barrier may be provided to keep the crystalline resin sandwich from prematurely contacting any of the curative component. The removable barrier is preferably made from a thin polymeric film that melts or otherwise is dissolved by the resin at temperatures between the ambient temperature at which the composition is stored and the curing temperature. Examples of suitable barrier film materials include aqueous film-forming emulsions and dispersions of polyethylene; oxidized polyethylene; ethylene copolymers with acrylic and methacrylic esters and acids; polyethylene waxes; carnauba wax and other naturally derived waxes. Thin films of polyethylene, poly(ethylene-co-propylene) and other ethylene copolymers; either applied as hot melts or from solution can also be used.

The curative component that is eventually combined with the crystalline resin composition includes one or more curing agents that may or may not be dissolved or otherwise suspended in a carrier. The curing agent(s) are selected such that they provide curing of the crystalline resin sandwich when combined therewith at temperatures equal to or below the above stated curing temperatures. The amount of curing agent required to provide adequate curing of the resin component will vary depending upon a number of factors including the type of resin being cured, the desired curing temperature and curing time. Curing agents typically include cyanoguanidine, aromatic and aliphatic amines, acid anhydrides, Lewis Acids, substituted ureas, imidazoles and hydrazines. The particular amount of curing agent required for each particular situation may be determined by well-established routine experimentation. Exemplary preferred curing agents include imidazole (1,3-diaza-2,4-cyclopentadiene) available from Sigma Aldrich (St. Louis, Mo.) 2-ethyl-4-methylimidazole available from Sigma Aldrich and boron trifluoride amine complexes, such as Anchor 1170, available from Air Products & Chemicals, Inc. (Allentown, Pa.).

The curing component, if desired, may include a carrier for the curing agent. The curing agents are suspended or dissolved in the carrier with the resulting mixture applied to the porous body or other surface where mixing with the resins contained in the crystalline resin sandwich will eventually take place. Exemplary carriers include ketones, such as acetone or methylethylketone or low molecular weight polyethyleneglycol. The amount of curing agent added to the carrier and the carrier type will vary depending upon where the curing agent is to be located and the physical form of the curative once deposited. When the curing agent is to be located in a porous body, such as fabric, the carrier must be sufficiently liquid to penetrate into the fabric. In situations where the curing component is in the form of a film, the carrier must be sufficiently viscous to form such films. The carrier can remain associated with the curative, for example in the case of BF3 complexes hosted in polyethyleneglycol, the curative formulation being designed such that the presence of the carrier does not interfere negatively with the cured performance of the assembly. Alternatively, the carrier can simply be used as a method for impregnation of the curative on the fabric where the carrier would typically be a higher volatility solvent such as the aforementioned methylethylketone or acetone, that is removed in a subsequent processing step leaving the reactive curative isolated on the porous body. Particularly exemplary of this mode of operation is the deposition of reactive solid imidazole curatives on porous bodies from acetone.

Figure 2:
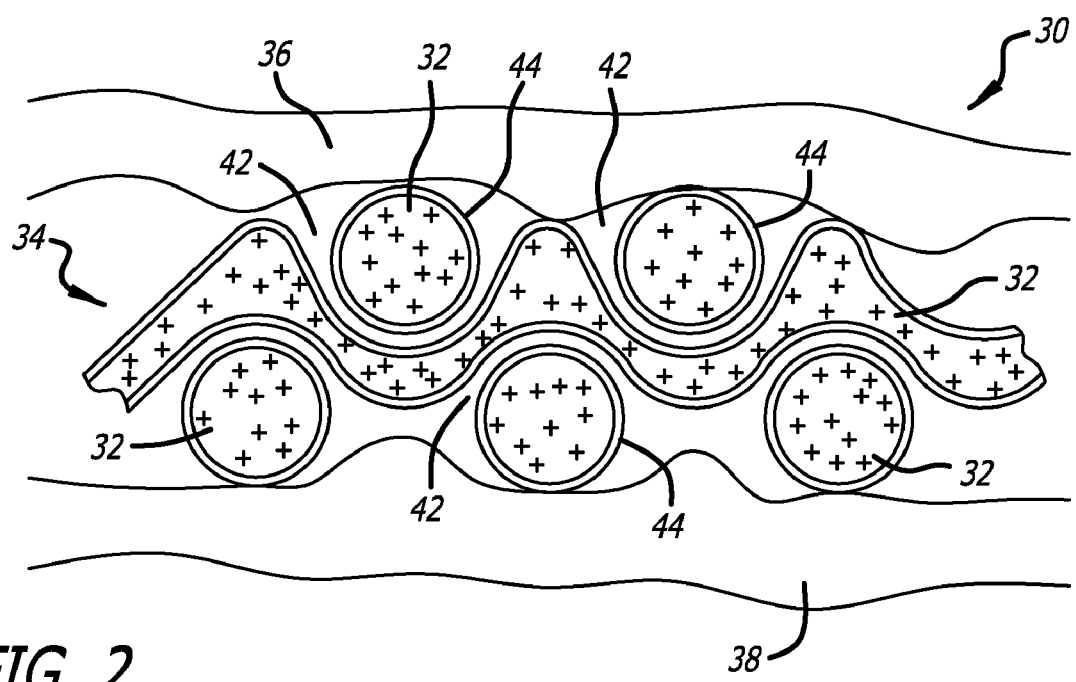
FIG. 2 is a diagrammatic representation of an exemplary method for making a resin composition in accordance with the present invention.

FIG. 2 is a diagrammatic representation of a prepreg 30 in which fiber tows 32 are woven into a fabric 34. Crystalline resin sandwich layers of the type shown in FIG. 1 are located on both sides of the fabric 34 as shown at 36 and 38. The woven fabric 34 may be viewed as a compound porous body that has discontinuous outer surfaces on either side of the fabric and interstitial spaces 42. In addition, each of the fiber tows 32 forms a porous body. Accordingly, there are porous bodies (tows) located within the porous body (fabric). The curative component in this embodiment is located within the porous structure of the individual tows as indicated by the plus symbols (+).

The present invention is especially well suited for use in prepreg because the large reduction in viscosity that occurs when the prepreg is heated to above ambient temperature provides relatively complete and rapid penetration of both the overall fabric and the individual tows. Since the curing agents (+'s) are located in the tows, it is necessary that the resin completely penetrate into the tows to provide uniform curing. The tows 32 in FIG. 2 are shown having optional removable barriers 44 surrounding each tow. It should be noted that a single fabric layer 34 is shown sandwiched between two crystalline resin sandwich layers 36 and 38. In alternative embodiments, multiple fabric layers can be used where not all of the layers include the curative component. For example, the fabric layer 34 can be sandwiched between two additional fabric layers that do not include a curative component. The crystalline resin sandwich layers on the outside of the structure, when heated, are converted to relatively low viscosity resins that are able penetrate through the additional layers before contacting the curative component. Also, as mentioned previously, the fabric layers (without curative agent) may be located within either or both of the crystalline or non-crystalline layers of the crystalline resin sandwich.

Another exemplary prepreg is shown generally at 50 in FIG. 3. This prepreg is similar to the prepreg shown in FIG. 2 in that it includes fiber tows 52 that have been woven into a single layer of fabric 54 that is sandwiched between two crystalline resin sandwich layers 56 and 58. The prepreg is shown at ambient temperature. At this temperature the crystalline resin sandwich layers 56 and 58 are in a high viscosity state that is sufficient to prevent a substantial amount of resin from flowing into or out of the interstitial spaces 60 and/or away from the exterior surfaces of the fabric 54. In this embodiment, the curative component (+'s) is located within the interstitial spaces of the fabric and not limited to the interstitial spaces of the tows. Optional removable reaction barriers are shown at 62 and 64. The removable reaction barrier is preferable in situations where it is desirable to eliminate any possible contact between the uncured resin and curing agent that might occur at the interface between the two components.

Four exemplary embodiments of prepreg made using the crystalline resin sandwich films of the present invention are shown in FIG. 4. The prepreg 410 shown in FIG. 4A has a resin component 412 in the form of a crystalline resin sandwich layer of the type shown in FIG. 1, a curative component in the form of curing agent layer 414 and a porous body in the form of dry fabric layer 416. During storage at ambient temperature, the crystalline resin sandwich remains in a high viscosity state and does not flow to any substantial degree into the fabric layer 416. In accordance with the present invention, when the prepreg 410 is heated under pressure to curing temperature, the crystalline resin sandwich 412 is converted to the low viscosity state and flows through the fabric layer 416 and into contact with the curative component 414.

Figure 4A:
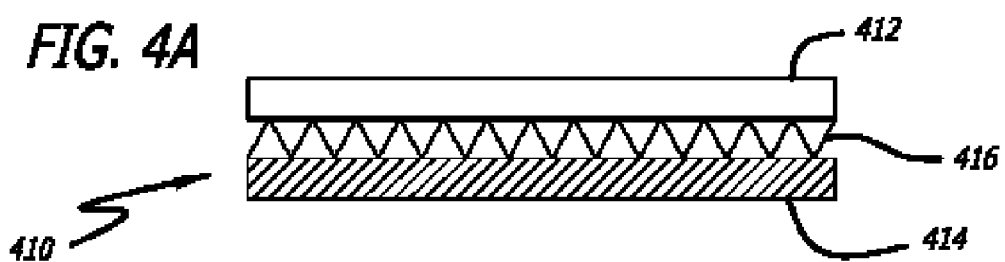
FIGS. 4A-4D are diagrammatic representations of four exemplary prepreg configurations in accordance with the present invention.
Figure 4B:
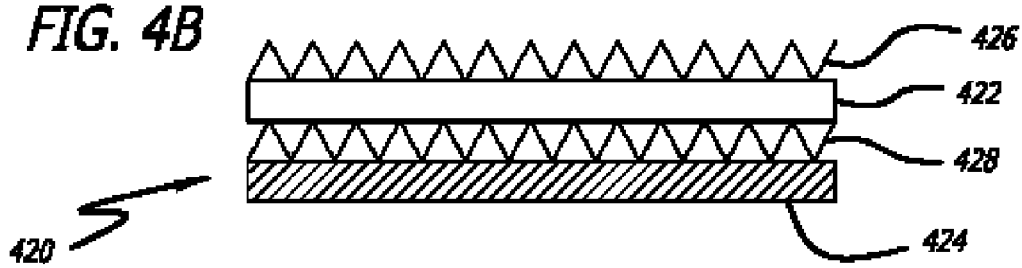
Figure 4C:
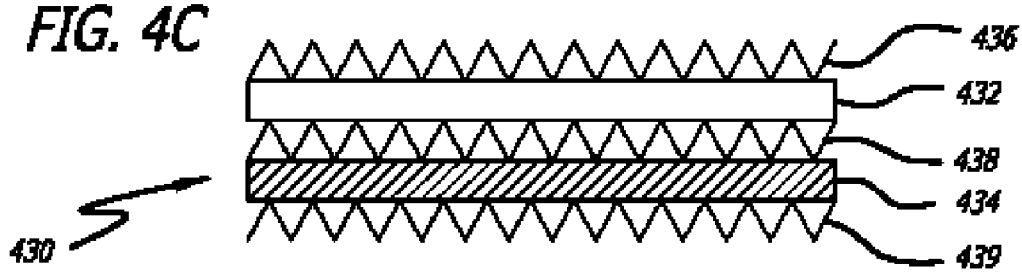
Figure 4D:
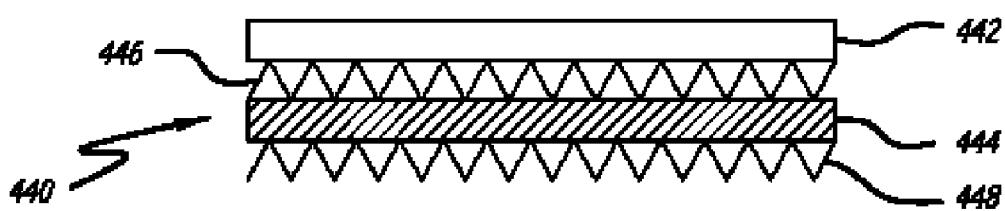

The prepreg shown at 420 in FIG. 4B is similar to the prepreg 410 except that it includes two fabric layers 426 and 428 as well as the crystalline resin sandwich layer 422 and curing agent layer 424. In accordance with the present invention, the crystalline resin sandwich layer in the low viscosity state is sufficiently fluid that is mixes thoroughly with the curing agent and also penetrates both fabric layers. Another prepreg configuration is shown at 430 in FIG. 4C. The prepreg 430 includes crystalline resin sandwich layer 432 and curing agent layer 434 that are separated by and sandwiched between fabric layers 436, 438 and 439. The crystalline resin sandwich becomes sufficiently fluid in the low viscosity state to flow throughout the structure to provide uniform mixing of resin and curing agent as well as uniform penetration of all three fabric layers. Prepreg 440 shown in FIG. 4D includes crystalline resin sandwich layer 442, curing agent layer 444 and fabric layers 446 and 448. The prepregs shown in FIG. 4 are all similar in that both the crystalline resin sandwich component and curative component are in the form of thin films that are separated from each other by at least one layer of fabric.

Figure 5A:
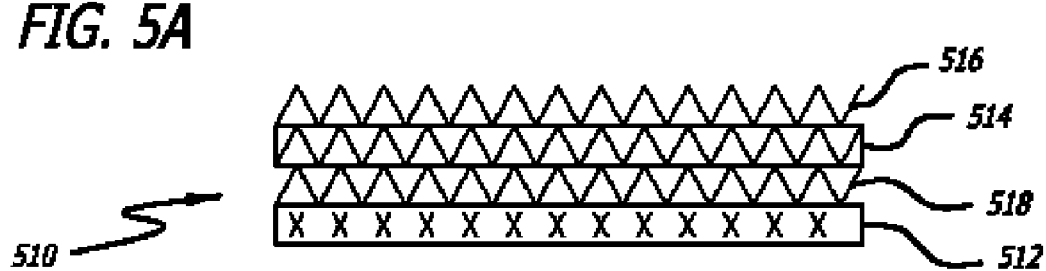
FIG. 5A-5C are diagrammatic representations of three exemplary prepreg configurations in accordance with the present invention.
Figure 5B:
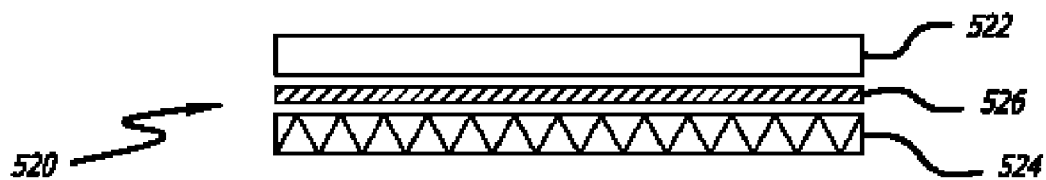
Figure 5C:
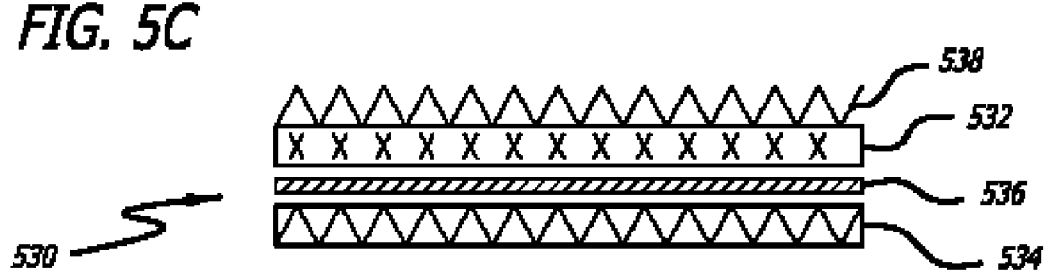

Three more embodiments of prepreg in accordance with the present invention are shown diagrammatically in FIGS. 5A-5C. Prepreg 510 (FIG. 5A) includes a crystalline resin sandwich layer 512 that includes a fabric layer (represented by x's) that is located in one or both of the non-crystallized resin layers in the crystallized resin sandwich layer. The overall assembly of 510 contains a typical amount of resin which is around 35% by weight. The curative component 514 is in the form of a layer of fabric that has been impregnated with the curing agent. The fabric/crystalline resin sandwich layer 512 is separated from the layer of curing agent impregnated fabric 514 by a dry layer of fabric 518. An additional layer of dry fabric 516 may optionally be added to the prepreg, if desired. Such fabric that has been impregnated with curing agent is disclosed in French Patent application No. 0210769 and co-pending U.S. patent application Ser. No. 10/648,159. The contents of these applications are also specifically incorporated by reference.

In FIG. 5B, a prepreg 520 is shown where the resin component is in the form of crystalline resin sandwich film 522 that is separated from "hardenerpreg" layer 524 by a removable reaction barrier film 526. "Hardenerpreg" is a term of art used to describe fiber or other types of reinforcement material that has the curative dispersed in, and/or on the reinforcement and wherein the reinforcement is free of resin. The prepreg 530 in FIG. 5C includes a crystalline resin sandwich layer 532 that contains an embedded fabric 532 and a hardenerpreg layer 534. The hardenerpreg 534 and crystalline resin sandwich layer 532 are separated by a removable reaction barrier film 536. An additional dry fabric layer 538 may be placed on top of the crystalline resin sandwich layer 532, if desired.

Figure 5D:
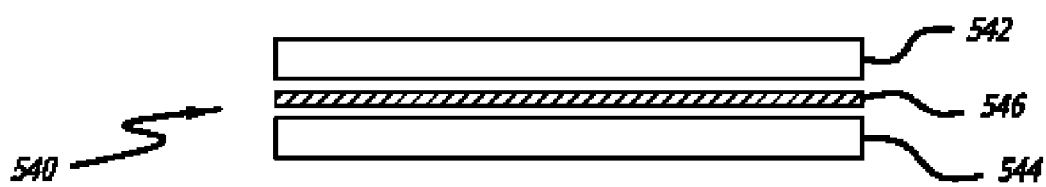
FIG. 5D is a diagrammatic representation of an adhesive in accordance with the present invention wherein the curative agent and the resin composition are separated by a fusible barrier.

An uncured resin composition in accordance with the present invention is shown at 540 in FIG. 5D. The resin composition is intended for use as an adhesive or in other situations where the uncured resin is not stored as part of a prepreg or other porous body. The composition 540 includes a crystalline resin sandwich layer 542 and a curing agent layer 544. A removable reaction barrier 546 is used to separate two layers 542 and 544 from each other Examples of practice are as follows:

Example 1

In this example, a resin composition as shown in FIG. 1 was prepared where a crystalline resin layer is sandwiched between two non-crystalline resin layers. The thermosetting resin formulation used to make the non-crystalline component was prepared by combining 16.5 weight % Araldite LY 1556 resin available from Huntsman (Salt Lake City, Utah) with 40.5 weight % DER 337 resin available form Dow Chemical Company (Wilmington, Del.) and 43.0 weight % Araldite GT6071 also available from Huntsman. The three non-crystalline thermosetting resins where mixed together at 120° C. until homogeneous and then cooled to ambient temperature. The resulting non-crystalline resin formulation was cast into a film with a nominal areal weight of 100 gsm.

A crystalline resin layer was formed by coating Ruetapox 0158 onto a piece of the non-crystalline film. Ruetapox 0158 is a crystalline resin that is available from Bakelite AG (Duisberg, Germany). The Ruetapox 0158 coating had a nominal areal weight of 200 gsm. A second piece of non-crystalline resin film was then place on top of the Ruetapox 0158 coating to form a resin composition. This composition was placed in a press at 25° C. and consolidated to form the final crystalline resin composition that contained equal amount of crystalline and non-crystalline resin having a total combined nominal areal weight of 400 gsmPas. The viscosity of the non-crystalline resin formulation (which is the effective viscosity of the outer portions of the sandwich) is 35684 mPas at 60° C. and at 80° C. decreases to 3616 mPas. When heated to 60° C., the viscosity of the entire resin composition dropped to 901 mPas.

A second resin composition was prepared in the same manner as described above except that two layers of non-crystalline resin were located on either side of the crystalline layer to provide a total nominal areal weight of 600 gsm and a weight ratio of non-crystalline resin to crystalline resin per square meter of 2 to 1. The viscosity dropped to 2586 mPas when the resin composition was heated to 60° C. Accordingly, the amounts of crystalline and non-crystalline resin can be tailored to give the most desirable or required viscosity at the cure temperature.

Example 2

Resin compositions were made in the same manner as EXAMPLE 1 except that the formulation for the non-crystalline resin component was changed to:

| Araldite LY1556 | 13.39% by weight |
| DER 337 | 35.71% by weight |
| Epikote 1001 | 50.89% by weight |
| ORASOL Red G | 00.01% by weight |

The resins were also mixed together at 120° C. until homogeneous and then cooled to ambient temperature. Epikote 1001 is available from Resolution Performance Products (Houston, Tex.) and ORASOL Red G is available from Huntsman. The viscosity of the non-crystalline resin component was 50830 mPas at 60° C. When heated to 60° C., the viscosity of the entire resin composition dropped to 1718 mPas.

Example 3

Resin compositions were made in the same manner as EXAMPLE 1 except that the formulation for the non-crystalline resin component was changed to:

| Araldite LY1556 | 11.64% by weight |
| DER 337 | 31.03% by weight |
| Epikote 1001 | 48.71% by weight |
| N-Ethyl-p-toluenesulfonamide | 8.62% by weight |
| ORASOL Yellow 3R | 0.01% by weight |

The resins were also mixed together at 120° C. until homogeneous and then cooled to ambient temperature. N-Ethyl-p-toluenesulfonamide is available from Sigma-Aldrich Corp. (St Louis, Mo.) and ORASOL Yellow 3R is available from Huntsman.

The viscosity of the non-crystalline resin component was 24300 mPas at 60° C. When heated to 60° C., the viscosity of the entire resin composition dropped to 689 mPas.

Example 4

Resin compositions were made in the same manner as EXAMPLE 1 except that the formulation for the non-crystalline resin component was changed to:

| DER 337 | 55% by weight |
| Epikote 1001 | 45% by weight |

The resins were also mixed together at 120° C. until homogeneous and then cooled to ambient temperature.

The viscosity of the non-crystalline resin component was 52421 mPas at 60° C. When heated to 60° C., the viscosity of the entire resin composition dropped to 1677 mPas.

Example 5

A semi-preg was formed by placing a resin composition made according to Example 4 on the surface of a sheet of a stitched bi-axial glass fabric (nominal areal weight 600 gsm). The glass fabric had been previously impregnated with Anchor 1170 which is a curing agent available from Air Products & Chemicals, Inc. (Allentown, Pa.). The nominal loading of Anchor 170 was 40 gsm. Four plies (approximately 100 mm×150 mm) of this semi-preg were laid up together and cured using a vacuum bag. The bagged semi-preg was loaded into an oven at below 40° C. and ramped at 2° C. per minute to a curing temperature of 60° C. The curing temperature was maintained for 1 hour. The cured laminate was cooled to ambient temperature and removed from the vacuum assembly. The cured laminate appeared well consolidated and cured uniformly. This demonstrates that the viscosity profile of the crystalline resin composition was suitable for infusion and mixing prior to cure. TA 2980 (DMA) testing gave the laminates cure $T_g$ as 73° C. (Peak tan delta). A single transition was seen over the test range of 20 to 200° C. which indicative of good mixing of the resin and curative component prior to curing.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A method for forming an uncured structure that is suitable for storage at ambient temperatures, said method comprising the steps of:
   a) providing a porous body comprising an exterior surface and interior surfaces located within said porous body that define interstitial spaces located within said porous body;
   b) providing a resin composition located at said exterior surface of the porous body, said resin composition forming a cured resin when exposed to a curing agent and heated to a curing temperature that is higher than said ambient temperature, said resin composition comprising:
   a first non-crystalline component, said non-crystalline component including one or more non-crystalline thermosetting resins;
   a second non-crystalline component, said non-crystalline component including one or more non-crystalline thermosetting resins; and
   a crystalline component that comprises one or more crystalline thermosetting resins wherein said crystalline component is located between said first and second non-crystalline components and wherein said one or more crystalline thermosetting resins has a melting point that is above said ambient temperature and below said curing temperature; and c) providing a curative component comprising a curing agent for said resin composition, said curing agent being separated from said resin composition during storage of said uncured structure at said ambient temperatures.

2. A method according to claim 1 wherein said curative component is located at the interior surfaces of said porous body.

3. A method according to claim 1 wherein said porous body comprises a plurality of fibers in the form of a fabric or unidirectional tape having a first side that defines said exterior surface and a second side that defines an additional exterior surface of said porous body and wherein said resin composition is located only at the first side of said fabric or unidirectional tape and said curative component is located on said second side of said fabric or unidirectional tape.

4. A method according to claim 1 where said porous body comprises a plurality of fibers in the form of a fabric or unidirectional tape having a first side that defines said exterior surface and a second side that defines an additional exterior surface of said porous body and wherein said resin composition is located at both the first side and second side of said fabric or unidirectional tape and said curative component is located at the interior surfaces of said fabric or unidirectional tape.

5. A method according to claim 1 wherein said resin composition is separated from said curative component by a removable reaction barrier located between said resin composition and said curative component.

6. A method according to claim 1 wherein said crystalline component comprises particles of one or more crystalline thermosetting resins.

7. A method according to claim 1 wherein said crystalline component is in the form of a film that comprises said one or more crystalline thermosetting resins.

8. A method according to claim 1 wherein said first and/or second non-crystalline components comprise a plurality of fibers.

9. A method according to claim 1 wherein said crystalline component comprises a plurality of fibers.

10. A method according to claim 8 wherein said crystalline component comprises a plurality of fibers.

11. A method according to claim 1 that includes the additional step of heating said uncured structure to said curing temperature for a sufficient time to form a cured structure.

12. A method according to claim 2 that includes the additional step of heating said uncured structure to said curing temperature for a sufficient time to form a cured structure.

13. A method according to claim 3 that includes the additional step of heating said uncured structure to said curing temperature for a sufficient time to form a cured structure.

14. A method according to claim 4 that includes the additional step of heating said uncured structure to said curing temperature for a sufficient time to form a cured structure.

15. A method according to claim 5 that includes the additional step of heating said uncured structure to said curing temperature for a sufficient time to form a cured structure.

16. A method according to claim 6 that includes the additional step of heating said uncured structure to said curing temperature for a sufficient time to form a cured structure.

17. A method according to claim 7 that includes the additional step of heating said uncured structure to said curing temperature for a sufficient time to form a cured structure.

18. A method according to claim 8 that includes the additional step of heating said uncured structure to said curing temperature for a sufficient time to form a cured structure.

19. A method according to claim 9 that includes the additional step of heating said uncured structure to said curing temperature for a sufficient time to form a cured structure.

20. A method according to claim 10 that includes the additional step of heating said uncured structure to said curing temperature for a sufficient time to form a cured structure.

* * * * *